United States Patent [19]

Leemhuis

[11] Patent Number: 4,714,005
[45] Date of Patent: Dec. 22, 1987

[54] POWER TRANSMISSION

[75] Inventor: Richard S. Leemhuis, Troy, Mich.

[73] Assignee: Vickers, Incorporated, Troy, Mich.

[21] Appl. No.: 889,617

[22] Filed: Jul. 28, 1986

[51] Int. Cl.[4] .......................... F15B 13/16; F17D 3/00
[52] U.S. Cl. .................................. 91/361; 137/624.11;
340/870.04; 364/571
[58] Field of Search .................... 137/624.11; 364/510,
364/571; 340/870.04; 324/158 SM; 91/361;
318/565

[56] References Cited

U.S. PATENT DOCUMENTS

| | | | |
|---|---|---|---|
| 3,654,446 | 4/1972 | Gordon et al. | 364/571 |
| 4,496,889 | 1/1985 | Fukuyama et al. | 318/565 |
| 4,523,286 | 6/1985 | Koga et al. | 137/554 X |
| 4,594,538 | 6/1986 | Schmitt | 318/565 |

Primary Examiner—William E. Wayner
Attorney, Agent, or Firm—Barnes, Kisselle, Raisch, Choate, Whittemore & Hulbert

[57] ABSTRACT

A system and method for remotely measuring and linearizing flow characteristics, specifically velocity characteristics, of an electrohydraulic servo valve and actuator system. A plurality of raw command signals are generated in sequence, and corresponding motion data at the valve and load (including the actuator) are measured and stored. A linearized characteristic is then generated corresponding to the range of motions measured, and a look-up table is generated which relates raw command signals to command signals necessary to obtain the desired linear motion characteristics.

12 Claims, 7 Drawing Figures

POWER TRANSMISSION

The present invention relates to measurement of flow characteristics of a servo valve in an electrohydraulic servo valve/actuator system, and more particularly to a method and system for effectively linearizing output velocity of the actuator.

BACKGROUND AND OBJECTS OF THE INVENTION

Conventional electrohydraulic servo valve assemblies and valve/actuator systems embody a number of non-linearities in the output versus valve control signal characteristic. For example, some valves embody so-called overlap which manifests itself as a flat spot near the origin of the flow versus control signal curve. Valve null shift near the curve origin is another common source of error. Valve non-linearities away from the origin can result from malfunction, such as a loose valve ball, either initially or after a period of operation. Significant non-linearities can also be caused by the load to which the valve is coupled, such as differential area actuators, or by flow saturation due to limited pump output.

It is conventional practice to attempt to overcome design non-linearities such as overlap and null shift through complementary electronic compensation. Thus, a specific analog control circuit may be designed to complement a specific valve or a specific valve/actuator systems. Such control circuits do not possess desired versatility and are difficult to adjust in the field. Moreover, a change in operating characteristics at the valve or load, due to environment or malfunction, leads to error and/or requires readjustment. A valve malfunction, such as spool winding or a loose ball in the valve servo spool ball hole, a problem known as "ball glitch", cannot be readily compensated in the electronics, and thus typically requires valve repair or replacement.

Another problem in the art lies in the requirement that diagnosis of a valve or valve/actuator problem usually involves hands-on testing by a skilled technician. Thus, a technician must travel to the location of use, or the valve must be replaced and shipped to the technician for service. Both options are expensive and time-consuming.

A general object of the present invention, therefore, is to provide a system and method for measuring and/or compensating valve flow characteristics which alleviate or overcome the aforementioned deficiencies in the art. More specific objects of the invention are to provide a system and method for deriving flow characteristics of a servo valve in a valve/actuator system which may be readily and economically electronically implemented, and which may be carried out remotely from the site of use without requiring disconnection of the valve and/or actuator. A further specific object of the invention is to provide a system and method of the described character which automatically compensate for non-linearities to yield a linear actuator velocity versus command signal characteristic.

SUMMARY OF THE INVENTION

An electrohydraulic servo/actuator system in accordance with the invention includes a servo valve coupled to an actuator and responsive to electronic valve control signals for selectively feeding fluid from a source to the actuator to obtain motion at the actuator. A sensor, preferably a position sensor, is coupled to the actuator for providing signals indicative of actual motion at the actuator. Such motion is, of course, a direct function of fluid flow through the servo valve, in addition to other factors. A master or command controller, which may be positioned remotely of the site of use, generates command signals as a function of desired motion at the actuator. A servo controller is responsive to such command signals and to motion signals from the position sensor for generating control signals to the servo valve. Most preferably, the servo controller comprises a microprocessor-based digital controller which forms part of the servo valve package. The servo controller is constructed to operate on command from the command controller selectively to operate in a closed-loop mode wherein the valve control signals vary as a function of the difference between the command and motion signals, and an open loop mode wherein the valve control signals vary with command signals independently of actual motion.

In accordance with present invention, the command controller includes facility for generating a plurality of successive flow command signals, preferably with the servo controller operating in open-loop mode, and for reading the resulting valve/actuator velocities as a function of corresponding load motion signals. Such resulting velocity data is stored and/or displayed as a function of corresponding command signals. Non-linearities may indicate malfunction and may be diagnosed by a technician. The entire operation may be carried out remotely of the installation site.

In accordance with another imporant feature of the invention, non-linearities in the velocity versus command characteristic, including constant (i.e., non-transient) nonlinearities due to minor malfunction, may be automatically compensated to obtain a linear velocity versus command characteristic which is desirable for control purposes. This is accomplished by first generating a desired linear velocity characteristic which is desirable for control purposes. This is accomplished by first generating a desired linear velocity characteristic based upon the raw data previously obtained and stored. Compensated or linearized flow command signals are then obtained from such linear characteristic for each of a plurality of discrete motion (velocity) values. Such linearized command signals are stored as a function of corresponding raw command signals, preferably as a table in the command controller or downloaded to the servo controller. This table may then be employed to convert raw command signals to linearized command signals, and thereby obtain linear velocity characteristics at the valve/actuator assembly.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
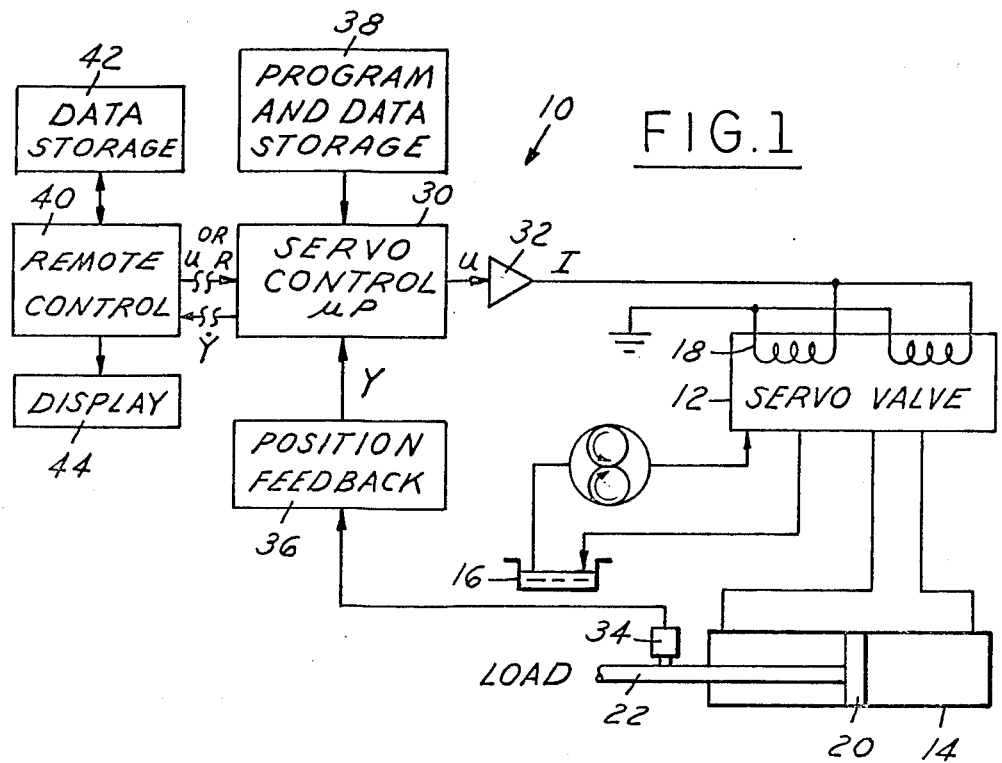
FIG. 1 is a functional block diagram of an electrohydraulic servo control system in accordance with an exemplary but preferred embodiment of the invention.

FIG. 1 illustrates a servo system 10 in accordance with the invention as comprising a servo valve 12 coupled to an actuator 14 (linear or rotary) for feeding hydraulic fluid thereto from a source 16 as a function of pulse width modulated control signals to the valve torque motor 18. Actuator 14 includes a piston 20 having a shaft 22 coupled to a load (not shown) for moving the load in the positive (left) or negative (right) direction, the direction designations being arbitrary. In general, as is well known in the art, velocity at actuator 14 varies as a direct function of fluid flow from valve 12. It will be noted in the example shown, however, that area of piston 20 on the right-hand side is greater than on the left, thus resulting in so-called differential area velocity error between positive and negative directions.

System 10 further includes a servo control microprocessor 30 which feeds valve control signals I to torque motor 18 through an amplifier 32. A sensor 34 is responsive to motion at actuator 14 for providing a position feedback signal Y to servo controller 30 through signal conditioning circuitry 36. Servo control microprocessor 30, which is coupled to a program and data storage memory 38, receives command signals R or U from a remote or master controller 40 and provides load velocity signals $\dot{Y}$ thereto. Controller 40, which is preferably a digital computer, is coupled to a table storage memory 42 and to a display 44, such as a screen or printer.

In a presently preferred embodiment of the invention, servo valve 12, servo control microprocessor 30, amplifier 32, feedback signal conditioning circuitry 36 and memory 38 are packaged as a signal unit as disclosed in (V-3985) U.S. application Ser. No. 849,540 filed Apr. 8, 1986 and assigned to the assignee thereof. A presently preferred technique for remote communication of signals R and $\dot{Y}$ (as well as other command and status signals) along a serial data bus, together with structure embodying such technique, is disclosed in (V-3939) U.S. application Ser. No. 849,542 filed Apr. 8, 1986 and assigned to the assignee hereof. The disclosures of such applications are incorporated herein by reference for the teachings indicated.

Figure 2:
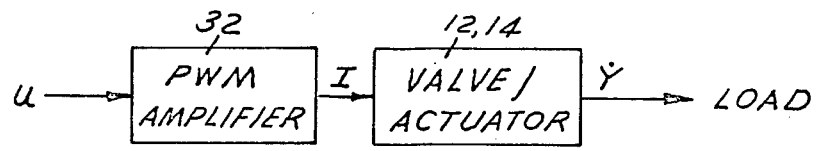
FIGS. 2 and 3 are respective block diagrams of the servo controller operating in open- and closed-loop modes.
Figure 3:
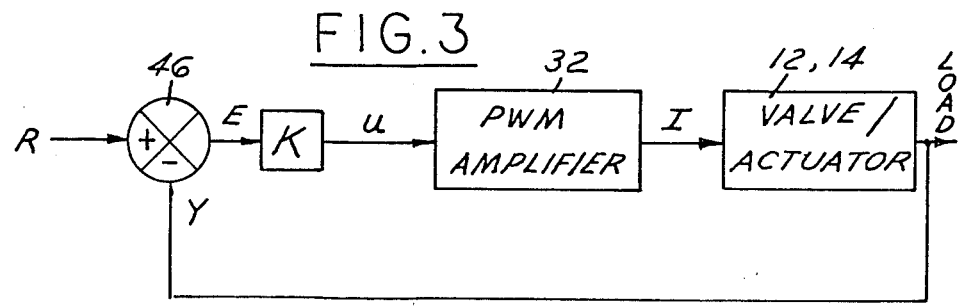

FIG. 2 is a flow diagram which illustrates operation of servo controller 30 in an open-loop mode, and FIG. 3 illustrates operation in a closed-loop mode. Such modes are selectable by transmission of control information from remote controller 40, the control parameters and programs being prestored in memory 38. In the open-loop mode (FIG. 2), the command signal U indicative of desired motion (velocity) at the load is fed through pulse width modulation amplifier 32 to valve torque motor 18 (FIG. 1) as the valve control or command signal I. During the closed-loop position control mode (FIG. 3) however, the command signal R, indicative of desired position at the actuator and load, is fed to a comparator 46 which receives a second input Y indicative of actuator position. The resulting difference or error signal E is multiplied by a constant K and fed to amplifier 32.

Figure 4:
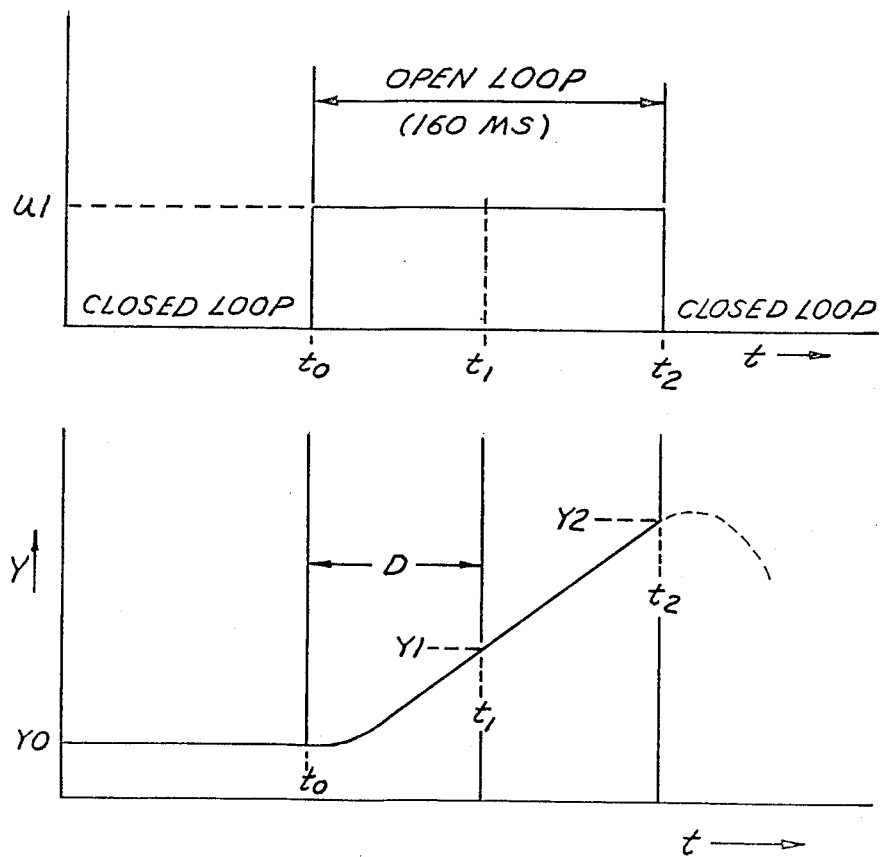
FIG. 4 is a timing diagram useful in explaining operation of the preferred embodiment of the invention.

In practice of the invention for measuring and tabulating velocity characteristics of valve 12 and actuator 14 (FIG. 1), controller 30 is operated in the closed-loop mode (FIG. 3) to a mid-stroke position YO (FIG. 4). (Note that such mid-stroke positioning would not be required by rotary actuators.) Operation is switched to the open-loop mode (FIG. 2), and a flow command U1 is transmitted at time $t_0$. Command U1 is maintained constant and, after a delay D sufficient to permit the valve/actuator combination to overcome the effects of inertia and reach constant velocity, velocity $\dot{Y}1$ is measured. The latter may be accocmplished by reading positions Y1 and Y2 at times t1 and t2, and dividing the differences (assuming linear velocity). Command U1 and resulting velocity $\dot{Y}1$ are stored in memory. The process is then repeated for multiple other commands U2, U3 etc, with the results likewise being tabulated. (Of course, it may be desirable to increase or decrease command U in known increments, so that only resulting velocity $\dot{Y}$ need be stored at this stage.)

Figure 5:
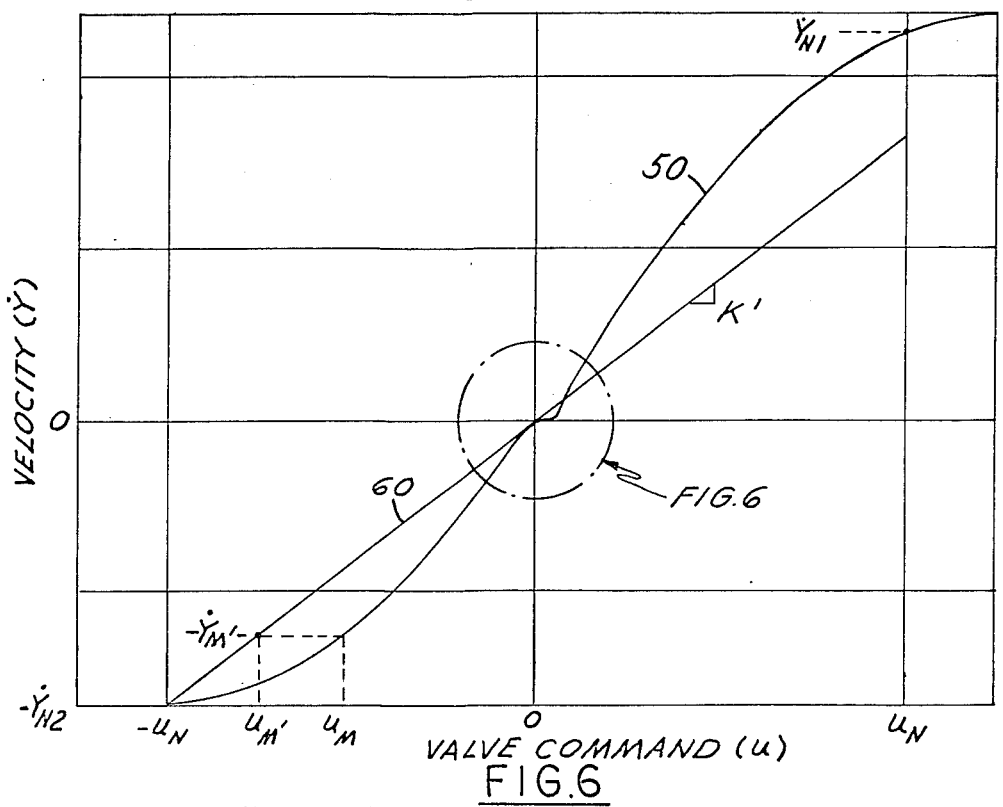
FIG. 5 is a graphic illustration of a servo valve velocity characteristic, both raw and linearized in accordance with the invention.
Figure 6:
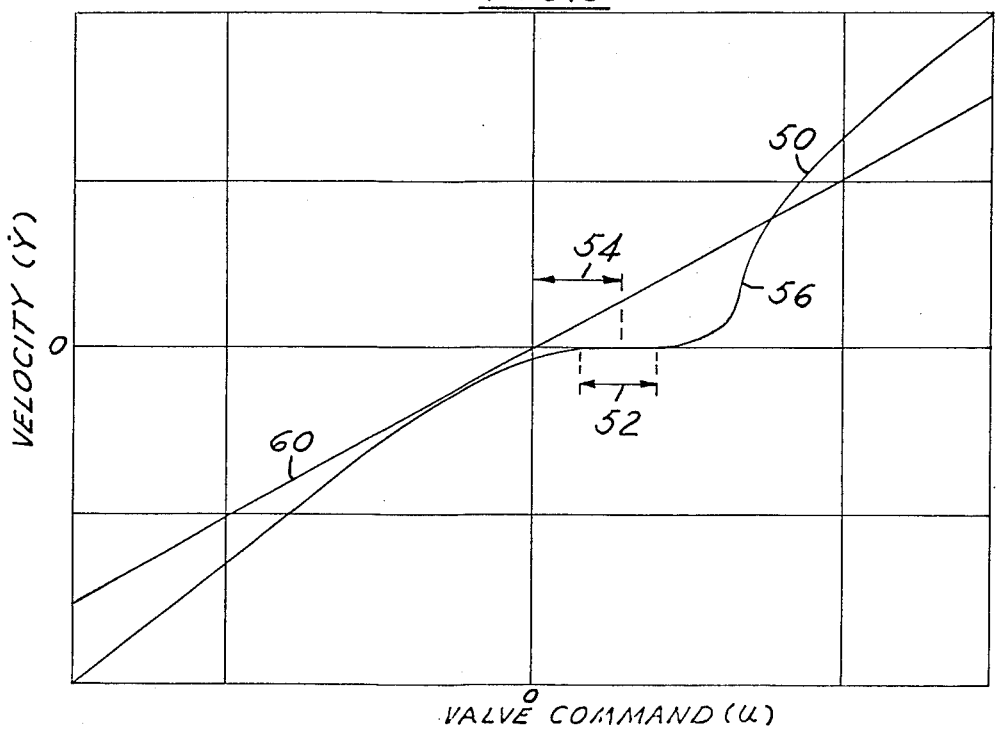
FIG. 6 is an enlarged view of that portion of FIG. 5 within the circle "FIG. 6"

The result of the foregoing process is illustrated graphically at 50 in FIGS. 5 and 6. Note the overlap 52 and null shift 54 in the curve 50 at the origin, which are typical of servo valves in the art. Underlap is also typical, but not illustrated in FIGS. 5 and 6. The discontinuity 56 indicates a loose valve ball. It will also be noted that the velocity $\dot{Y}_{N1}$ in the positive direction for the command $U_N$ is greater than the velocity $-\dot{Y}_{N2}$ in the negative direction for the corresponding negative command $-U_N$. This is due to the differential actuator area previously discussed.

Figure 7:
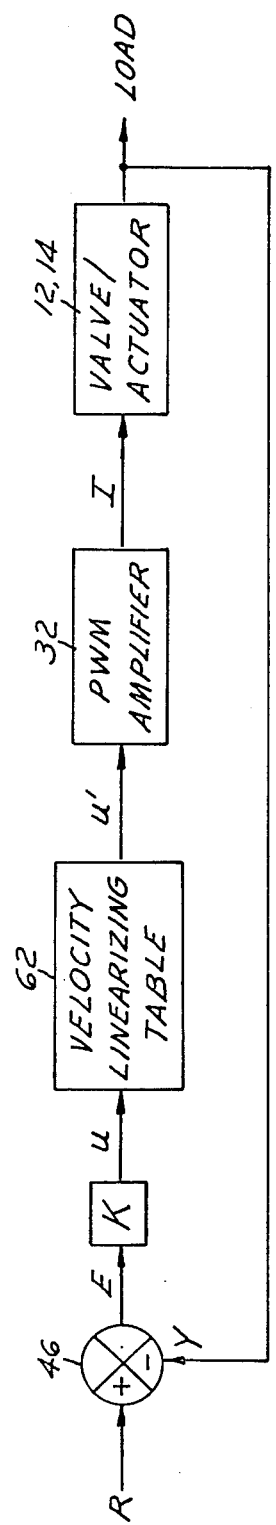
FIG. 7 is a functional block diagram of the servo controller operating in a compensated closed-loop mode in accordance with the invention.

In accordance with a second important aspect of the present invention, the velocity versus command characteristic so obtained and stored is linearized as in the curve 60 (FIGS. 5 and 6). This is accomplished by first generating the desired linear characteristic curve 60 to intersect the lesser (positive or negative) velocity limit—i.e., the point $-U_N$, $-\dot{Y}_{N2}$ in the example of FIGS. 5–6—and to pass through the origin. The slope of curve 60 is equal to K' (FIGS. 2 and 3). At each of a plurality of desired velocities $\dot{Y}'$, a corresponding linearized command signal U' is equal to Y'/K'. The previously stored raw data tables are scanned, and the valve command signal U which most closely produces the desired velocity $\dot{Y}'$ is found. For example, in FIG. 5, the actual command $U_M$ rather than the "linearized" command $U_M'$ will produce the velocity $\dot{Y}_M'$. This process is repeated for multiple values of $\dot{Y}'$. A second table 62 (FIG. 7) is thus generated relating linearized commands U' with corresponding raw commands U. This second table is stored as a look-up table at 42 (or 38, FIG. 1) and may be used to obtain linearize actuator velocity when desired. The data can also be used to check valve wear. An example of closed-loop position control employing linearized actuator velocity is illustrated in FIG. 7.

It will be appreciated, of course, that the foregoing process can be completed either entirely or partially under automated control of a suitably programmed digital computer. Remote control 40 may comprise a host computer coupled to a multiplicity of servo controllers 30 and programmed to test the several valves periodically for changes in operating characteristics. In one particularly important application of the invention, remote control 40 may be located in a technician laboratory and coupled on request to remote servo controllers 30 by telephone. In this way, the technician can not only diagnose valve problems from the laboratory, but can down-load compensating data to the servo controller where appropriate.

The invention claimed is:

1. In an electrohydraulic servo system which includes a servo valve for variably feeding hydraulic fluid from a source to a load, means coupled to the load for providing signals as a function of motion at the load, means for selectively providing command signals, and servo control means responsive to said command signals and to said motion signals for controlling fluid flow at said valve as a continuing function of said command signals between flow limits, a method of measuring fluid flow characteristics at said valve comprising the steps of:
   (a) generating a preselected raw flow command signal and feeding said raw flow command signal to said servo control means,
   (b) measuring said motion signal indicative of motion at the load and determining velocity of motion at said load obtained responsive to said preselected raw flow command signal,
   (c) repeating said steps (a) and (b) for a plurality of differing raw flow command signals, and
   (d) storing velocity at said load determined in said step (b) as a function of corresponding raw flow command signals generated in said step (a).

2. In an electrohydraulic servo system which includes a servo valve for variably feeding hydraulic fluid from a source to a load, means coupled to the load for providing signals as a function of motion at the load, means for selectively providing command signals, and servo control means responsive to said command signals and to said motion signals for controlling fluid flow at said valve, a method of measuring fluid flow characteristics at said valve comprising the steps of:
   (a) generating a preselected raw command signal and feeding said raw command signal to said servo control means,
   (b) measuring said motion signal indicative of motion at the load responsive to said preselected raw command signal,
   (c) repeating said steps (a) and (b) for a plurality of differing raw command signals,
   (d) storing said motion signals as a function of said raw command signals, and
   (e) linearizing said fluid flow characteristics as a function of said command signals by:
      (e1) generating a linearized motion versus command characteristic,
      (e2) from said motion and raw command signals stored in said step (d), obtaining a linearized command signal corresponding to a preselected motion signal on said linearized motion versus command characteristic,
      (e3) repeating said step (e2) for each of a plurality of preselected motion signals on said linearized motion versus command characteristics, and
      (e4) storing said linearized command signals obtained in said steps (e2) and (e3) as a function of said raw command signals.

3. The method set forth in claim 2 wherein said servo control means includes means constructed selectively to operate in an open-loop mode wherein said control means is responsive to said command signals independently of said motion signals, and in a closed-loop mode wherein said control means controls said valve as a function of a difference between said motion and command signals, and wherein said steps (a)-(c) are carried out in said open loop mode.

4. In an electrohydraulic servo system which includes a servo valve for variably feeding hydraulic fluid from a source to a load, means coupled to the load for providing signals as a function of motion at the load, mean for selectively providing command signals, and servo control means responsive to said command signals and to said motion signals for controlling fluid flow at said valve,
   said servo control means including means constructed selectively to operate in an open-loop mode wherein said control means is responsive to said command signals independently of said motion signals, and in a closedloop mode wherein said control means controls said valve as as function of a difference between said motion and command signals,
   a method of measuring fluid flow characteristics at said valve comprising the steps of:
   (a) generating a preselected raw command signal and feeding said raw command signal to said servo control means,
   (b) measuring said motion signal indicative of motion at the load responsive to said preselected raw command signal,
   (c) repeating said steps (a) and (b) for a plurality of differing raw command signals, and
   (d) storing said motion signals as a function of said raw command signals,
   said steps (a) through (c) being carried out in said open loop mode.

5. The method set forth in claim 4 comprising the additional step of linearizing said fluid flow characteristics as a function of said command signals by:
   (e) generating a linearized motion versus command characteristic,
   (f) from said motion and raw command signals stored in said step (d), obtaining a linearized command signal corresponding to a preselected motion signal on said linearized motion versus command characteristic,
   (g) repeating said step (f) for each of a plurality of preselected motion signals on said linearized motion versus command characteristics, and
   (h) storing said linearized command signals obtained in said steps (f) and (g) as a function of said raw command signals.

6. The method set forth in claim 4 comprising the additional step between said steps (a) and (b) of delaying said step (b) following said step (a) for a preselected time duration to overcome effects of inertia at the load.

7. An electrohydraulic servo system comprising a servo valve responsive to valve signals for selectively feeding hydraulic fluid from a source to a load, sensor means coupled to said load for providing motion signals as a function of actual velocity at said load, said actual velocity at said load being a function of fluid flow at said servo valve, means for selectively providing flow command signals as a function of desired motion at said load, servo control means responsive to said flow command signals and to said motion signals for generating said valve signals to said valve,
   characterized in that said system further comprises means for measuring flow characteristics at said valve as a function of command signals, including means for sequentially generating a plurality of preselected raw command signals, means for measuring said motion signal and determining velocity at said load as a function of said motion signal responsive to each of said plurality of raw flow command signals, and means for storing load velocity so determined as a function of corresponding raw flow command signals.

8. The system set forth in claim 7 wherein said commandsignal providing means, including said storing means, comprises microprocessor-based control means for storing load velocity in a table as a function of said raw flow-command signals.

9. The system set forth in claim 8 wherein said servo control means comprises means constructed selectively to operate in a closed-loop mode for providing said valve signal as a function of a difference between said command and motion signals, and in an open-loop mode wherein said valve signals are provided as a function of said command signals independently of said motion signals, and wherein said means for measuring said flow characteristics comprises means for operating said servo control means in said open-loop mode responsive to said raw command signals.

10. An electrohydraulic servo system comprising a servo valve responsive to valve signals for selectively feeding hydraulic fluid from a source to a load, sensor means coupled to said load for providing motion signals as a function of actual motion at said load, said actual motion at said load being a function of fluid flow at said servo valve, means for selectively providing command signals as a function of desired motion at said load, servo control means responsive to said command signals and to said motion signals for generating said valve signals to said valve, characterized in that said system further comprises means for measuring flow characteristics at said valve as a function of command signals, including means for sequentially generating a plurality of preselected raw command signals, means for measuring said motion signal responsive to each of said plurality of raw command signals, and means for storing said motion signals as a function of corresponding raw command signals, in that said command-signal providing means, including said storing means, comprises microprocessor-based control means for storing said motion signals in a table as a function of said raw command signals, and in that said servo control means comprises means constructed selectively to operate in a closed-loop mode for providing said valve signal as a function of a difference between said command and motion signals, and in an open-loop mode wherein said valve signals are provided as a function of said command signals independently of said motion signals, said means for measuring said flow characteristics comprising means for operating said servo control means in said open-loop mode responsive to said raw command signals.

11. The system set forth in claim 10 wherein said means for measuring said flow characteristics further comprises means for delaying measurement of said motion signal responsive to each said raw command signal for a time sufficient to overcome effects of inertia at said servo valve and load.

12. The system set forth in claim 11 characterized in that said system further comprises means for linearizing said flow characteristics as a function of said command signals, including means for generating a linearized motion versus command characteristic, means for obtaining from said table a linearized command signal corresponding to each of a preselected plurlaity of motion signals on said linearized motion versus command characteristic, and means for storing as a second table said linearized command signal as a function of said raw command signals.

* * * * *